US 8,874,036 B2

(12) United States Patent
Sakai et al.

(10) Patent No.: US 8,874,036 B2
(45) Date of Patent: Oct. 28, 2014

(54) MOBILE TERMINAL, INFORMATION TRANSMITTING/RECEIVING METHOD, SERVER APPARATUS, READER-WRITER, AND MEMBER PRIVILEGE ACQUIRING SYSTEM

(75) Inventors: Takahiro Sakai, Tokyo (JP); Jun Tada, Tokyo (JP); Hiroyuki Nagasawa, Tokyo (JP); Hiroshi Nakamura, Tokyo (JP)

(73) Assignee: FeliCa Networks, Inc. (JP)

( * ) Notice: Subject to any disclaimer, the term of this patent is extended or adjusted under 35 U.S.C. 154(b) by 544 days.

(21) Appl. No.: 12/931,139

(22) Filed: Jan. 25, 2011

(65) Prior Publication Data

US 2011/0195663 A1    Aug. 11, 2011

(30) Foreign Application Priority Data

Feb. 8, 2010 (JP) ................ P2010-025317

(51) Int. Cl.
*H04B 7/00* (2006.01)
*H04L 12/66* (2006.01)
*H04L 29/08* (2006.01)
*G06Q 30/02* (2012.01)
*G06Q 10/00* (2012.01)
*H04M 1/725* (2006.01)

(52) U.S. Cl.
CPC ............ *H04L 12/66* (2013.01); *H04M 1/7253* (2013.01); *H04L 67/02* (2013.01); *H04L 67/04* (2013.01); *G06Q 30/0207* (2013.01); *H04M 1/72561* (2013.01); *G06Q 10/00* (2013.01)
USPC ...... 455/41.2; 340/10.1; 340/10.5; 340/10.42

(58) Field of Classification Search
USPC ..................... 455/41.2; 340/10.1, 10.5, 10.42
See application file for complete search history.

(56) References Cited

U.S. PATENT DOCUMENTS

| | | | |
|---|---|---|---|
| 8,371,503 B2 * | 2/2013 | Gazdzinski ................ | 235/380 |
| 2002/0140714 A1 * | 10/2002 | Hoffman .................... | 345/700 |
| 2004/0181450 A1 * | 9/2004 | Yamada et al. ............. | 705/14 |
| 2005/0079817 A1 * | 4/2005 | Kotola et al. ............. | 455/41.2 |
| 2005/0178832 A1 * | 8/2005 | Higuchi .................... | 235/440 |
| 2005/0252979 A1 * | 11/2005 | Konuma et al. ............ | 235/492 |
| 2006/0224887 A1 * | 10/2006 | Vesikivi et al. ........... | 713/166 |
| 2006/0258323 A1 * | 11/2006 | Hara et al. ............... | 455/343.2 |
| 2007/0069851 A1 * | 3/2007 | Sung et al. ................ | 340/5.1 |
| 2007/0073766 A1 * | 3/2007 | Porter .................... | 707/103 R |
| 2008/0088454 A1 * | 4/2008 | Flores et al. ............. | 340/572.4 |
| 2008/0208753 A1 * | 8/2008 | Lee et al. ................. | 705/51 |

(Continued)

FOREIGN PATENT DOCUMENTS

JP    2009-276932 A    11/2009

*Primary Examiner* — Nay A Maung
*Assistant Examiner* — Erica Fleming-Hall
(74) *Attorney, Agent, or Firm* — Lerner, David, Littenberg, Krumholz & Mentlik, LLP

(57) ABSTRACT

There is provided a mobile terminal including: a contactless communication unit transmitting an IC identifier to a reader-writer that carries out contactless communication and receiving link information including the IC identifier from the reader-writer; and a wireless communication unit accessing a server based on the link information, transmitting the link information to the server, transmitting the IC identifier to the server separately to the link information, and operable, when the server has judged based on the IC identifier that contactless communication with the reader-writer and access to the server were both carried out using a same mobile terminal owned by a user, to receive information relating to privilege available to the user on a service used by the user from the server apparatus.

14 Claims, 15 Drawing Sheets

(56) References Cited

U.S. PATENT DOCUMENTS

2009/0115573 A1* 5/2009 Naressi et al. ............... 340/10.1
2009/0276862 A1* 11/2009 Komori et al. .................. 726/30
2009/0303009 A1* 12/2009 Itasaki et al. ................. 340/10.1
2011/0165859 A1* 7/2011 Wengrovitz .................. 455/411

* cited by examiner

FIG.10A (A) STORE VISIT APPLICATION LOG

| MOBILE UNIQUE ID | MEDIA MEMBER ID | IC CHIP UNIQUE ID | PROGRAM ID | MEDIA ID | STORE VISIT APPLICATION DATE AND TIME |
|---|---|---|---|---|---|
| uid001 | id001 | icid001 | pg001 | media001 | 0812201154 |
| uid001 | id001 | icid002 | pg002 | media002 | 0812301232 |
| uid002 | id003 | icid003 | pg004 | media003 | 0901010315 |

(B) BASIC STORE INFORMATION

| REAL BUSINESS ID | BUSINESS NAME | SECTOR | CONTRACT | RW-ID | OTHER |
|---|---|---|---|---|---|
| REAL BUSINESS 001 | ○○ KARAOKE | KARAOKE | BASIC | RW-ID001 | ... |
| REAL BUSINESS 002 | △△ NOODLES | FOOD & DRINK | BASIC | RW-ID004 | ... |
| ... | ... | ... | ... | ... | ... |

(C) RW SETTING INFORMATION

| RW-ID | REAL BUSINESS ID | STORE NAME | STORE ADDRESS | PROGRAM ID | PROGRAM ID | PROGRAM ID |
|---|---|---|---|---|---|---|
| RW-ID001 | REAL BUSINESS 001 | YOYOGI BRANCH | ··· TOKYO | pg001 | pg002 | ... |
| RW-ID002 | REAL BUSINESS 001 | SHIBUYA BRANCH | ··· TOKYO | pg001 | pg003 | ... |
| RW-ID003 | REAL BUSINESS 001 | HARAJUKU BRANCH | ··· TOKYO | pg001 | pg003 | ... |
| RW-ID004 | REAL BUSINESS 002 | UMEDA BRANCH | ··· OSAKA | ... | ... | ... |
| RW-ID005 | REAL BUSINESS 003 | NAGOYA BRANCH | ··· AICHI | ... | ... | ... |

FIG.10B (D) CAMPAIGN INFORMATION

| PROGRAM ID | REAL BUSINESS ID | MEDIA ID | GRANTED PRIVILEGE | GRANTING CONDITION | PRIVILEGE GRANTING CONDITION | MULTIPLE PASSING PREVENTING PERIOD | PRIVILEGE GRANTING PERIOD |
|---|---|---|---|---|---|---|---|
| pg001 | REAL BUSINESS 001 | media001 | 30 POINTS | STORE VISIT | EVERY VISIT | 30 MINUTES | 2009.10.01-2010.12.31 |
| pg002 | REAL BUSINESS 001 | media002 | MUSICAL RINGTONE | PURCHASE PRODUCT A | UP TO ONCE A WEEK | ONE HOUR | ... |
| pg003 | REAL BUSINESS 001 | media004 | AVATAR | SPEND AT LEAST 1000 YEN | UP TO THREE TIMES A MONTH | TWO HOURS | ... |
| pg004 | REAL BUSINESS 002 | media003 | ITEM | ... | ... | ... | ... |

(E) BASIC MEDIA INFORMATION

| MEDIA ID | BUSINESS NAME | CATEGORY | CONTRACT TYPE | RESULT LOG REPLY DESTINATION | OTHER |
|---|---|---|---|---|---|
| media001 | ○ SITE | POINTS | BASIC | ... | ... |
| media002 | △ SITE | SNS | BASIC | ... | ... |
| media003 | ■ SITE | PORTAL | BASIC | ... | ... |

FIG.10C (F) STORE VISIT/Web ACCESS/PRIVILEGE ACQUISITION LOG

| MOBILE UNIQUE ID | RW-ID | IC CHIP UNIQUE ID | pushURL-TIME/DATE | PRIVILEGE ACQUISITION TIME/DATE | ACQUIRED PRIVILEGE= PRPGRAM ID | PRODUCT ID | PRODUCT PRICE | PURCHASED NUMBER | TOTAL COST |
|---|---|---|---|---|---|---|---|---|---|
| uid001 | rw001 | icid001 | 0901011200 | 0901011230 | pg001 | 0001 | 1050 | 2 | 2100 |
| uid002 | rw002 | icid002 | 0901020850 | 0901031011 | UNACQUIRED | 0002 | 800 | 1 | 800 |
| uid003 | rw003 | icid003 | 0901030350 | 0901030351 | pg004 | 0003 | 3200 | 1 | 3200 |

(G) EXAMPLE OF MEDIA-SIDE MEMBER DB

| MOBILE UNIQUE ID | MEMBER ID | NUMBWE OF POINTS | OTHER |
|---|---|---|---|
| uid001 | mid001 | ... | ... |
| uid002 | mid002 | ... | ... |
| uid003 | mid003 | ... | ... |

FIG.11A

SETTING ITEMS PROVIDED IN MEDIA SET URL

PROGRAM ID    MEDIA ID http://www.・・・.jp/?p=123456&m=12345678

FIG.11B

SETTING ITEMS IN URL PUSHED FROM RW

IC CHIP UNIQUE ID    TIME STAMP http://www.・・・.jp/?i=1234567890123456&t=12345678901234&o=
12345678.12345678.12.1234567890123&r=12345678&s=1234567
                  OTHER PARAMETERS  RW-ID  SIGNATURE

ORDER NUMBER/ PRODUCT PRICE/ PURCHASED NUMBER/ PRODUCT CODE

MOBILE TERMINAL, INFORMATION TRANSMITTING/RECEIVING METHOD, SERVER APPARATUS, READER-WRITER, AND MEMBER PRIVILEGE ACQUIRING SYSTEM

CROSS-REFERENCE TO RELATED APPLICATION

The present application claims priority from Japanese Patent Application No. JP 2010-025317 filed in the Japanese Patent Office on Feb. 8, 2010, the entire content of which is incorporated herein by reference.

BACKGROUND OF THE INVENTION

1. Field of the Invention

The present invention relates to a mobile terminal, an information transmitting/receiving method, a server apparatus, a reader-writer, and a member privilege acquiring system.

2. Description of the Related Art

One conceivable business model would be for an Internet company that runs a website to use the website to publicize a store (hereinafter "real store") that exists not on the Internet but in actual society so as to entice users to visit the real store, with the real store then paying performance-based compensation in accordance with store visits and purchases at the real store. When doing so, an affiliate service provider acts as an intermediary between the Internet company that puts up an advertisement and the real store.

However, the service described above cannot be realized by an existing affiliate service that entices users who have viewed advertisements placed on a website to visit stores that exist on the Internet, or by an easily imagined method. As examples, this is thought to be due to the business, service, and technology-related issues faced in tracking proof of whether a user who has viewed an advertisement on a website has visited a real store or made a purchase.

Technologies that track a store visit performance and purchase performance of a user using a mobile telephone have the following problems.

First, one conceivable method would be to transmit position information from a mobile telephone during a store visit using GPS and then use such information as a store visit log that serves as proof of store visits. However, position information produced by GPS cannot accurately specify that a user has visited a store due to reasons including an inability to distinguish between floors of a building and insufficient precision. This means that there is the risk of a store being incorrectly charged for store visits even when users have not actually visited the store. On the other hand, there is also the risk that it will not be possible to correctly charge a store for store visits when users have actually visited the store. In addition, since it is not possible to track purchase performance and the like using only position information produced by GPS, it would be difficult to flexibly set the performance-based compensation in accordance with purchase performance and the like.

Secondly, for a case where a user can acquire privileges by visiting a real store and making purchases, one conceivable method would be for the user to show the screen of a mobile telephone that displays a certificate, such as a coupon or a membership card, for acquiring a privilege to a staff member of the real store during a visit. However, since it is possible for the user to transfer a URL or the like of the screen being presented here to someone else, it is difficult to determine whether the user who actually viewed the site and the user who has come to the store are the same person. This means that illicit activity may occur due to collusion between users. It is also difficult for such a system to accurately grasp performance in its entirety. That is, by making a false application, such as when staff members do not add to the store visit performance when users make actual store visits, a real store can illegally avoid having to pay performance-based compensation to a website. As a result, it is difficult to conduct a business for calculating and charging performance-based compensation in accordance with store visits. In addition, since a step of confirming store visits through visual confirmation and/or manual input by store staff members is required, there is the possibility of operator error. Since store operation is made more complex, this can significantly reduce the business merits of the system to a store and act as a further barrier to such service being introduced.

Thirdly, another conceivable method would be to have a reader-writer (R/W apparatus) connected to a POS terminal read a membership certificate registered in a contactless IC chip installed inside a card or a mobile telephone when the user visits a store, to transmit a store visit and purchase history to a server, and to match such information against site viewing log information of members registered in the server. However, since a reader-writer that is connected to a network would be required, the cost to a store of installing and maintaining a reader-writer is high, which can significantly reduce the business merits of this system. It is also necessary for the reader-writer connected to a network to be the only interface between the server and the user. This means that the reader-writer needs a screen or the like to inform the user of the processing result of the server. For store visit and purchase performance in a case where a plurality of privilege acquisition rights are generated, a device is required to enable the user to select a privilege. As one example, an input apparatus such as a touch panel or buttons is required. In addition, if a combination of devices is used with sites being viewed on a mobile telephone and store visit applications being made using a card-type device, extra cost is incurred in having to distribute the cards. Also, since the mobile telephone on which the user views the site and the card are physically separate, it is difficult to determine whether the user who viewed the site and the user who has come to the store are the same person and technically difficult to prevent identity problems, such as users handing their cards to others.

Fourthly, yet another conceivable method would be for a user to acquire a QR code on display at a store during a store visit, to access a website using the QR code, and to use a terminal unique ID (UID or the like) of a mobile telephone to match the user who has come to the store against a list of users who have previously viewed the website. However, when a QR code is used, the URL transferred via the QR code is static and cannot be appended with a timestamp showing when the QR code was actually acquired (i.e., when the user visited the store) or a serial number or the like set in accordance with a number of times the QR code has been read. This means that by making multiple accesses to the URL represented by the QR code, it is possible for the user to illegally apply for privileges granted for multiple store visits. If multiple accesses from a terminal unique ID of the same mobile telephone were excluded to prevent such illegal behavior, it would not be possible to count the actual store visit performance from the second visit onwards, which limits service flexibility. In order to count store visits from the second visit onwards, it would be conceivable to use a system or arrangement where a QR code with a different URL every time is distributed or displayed at the store entrance. However, the cost incurred by issuing and printing QR codes in which different URLs are embedded and the additional management required for the store entrance are disadvantageous from a business standpoint. In addition, when QR codes are used, it is not possible to acquire an IC chip unique ID of the mobile telephone that actually read the QR code on display at the store. This means that by transferring the URL of the QR code to a third party, it becomes possible for users who have not actually visited the store to illegally apply for privileges granted for store visits. Preventing such illegal activity is extremely difficult.

SUMMARY OF THE INVENTION

The present invention was conceived in view of the problem described above and aims to provide a novel and improved mobile terminal, an information transmitting/receiving method, a server apparatus, a reader-writer, and a member privilege acquiring system that enable privileges that are available to a user on a service used by the user to be reliably granted to a user of a mobile terminal that has carried out contactless communication with a reader-writer.

According to an embodiment of the present invention, there is provided a mobile terminal includes a contactless communication unit transmitting an IC identifier that specifies an IC chip installed inside the mobile terminal to a reader-writer that carries out contactless communication and receiving link information including the IC identifier from the reader-writer, and a wireless communication unit accessing a server apparatus based on the link information, transmitting the link information to the server apparatus, transmitting the IC identifier to the server apparatus separately to the link information, and operable, when the server apparatus has judged based on the IC identifier that contactless communication with the reader-writer and access to the server apparatus were both carried out using a same mobile terminal owned by a user, to receive information relating to at least one privilege available to the user on a service used by the user from the server apparatus.

In this configuration, the link information received by the contactless communication unit from the reader-writer further includes a reader-writer identifier that specifies the reader-writer, and the wireless communication unit is operable, when the server apparatus has judged based on the reader-writer identifier that there is at least one privilege available to the user on the service used by the user, to receive information relating to the at least one privilege available to the user from the server apparatus.

In this configuration, the link information received by the contactless communication unit from the reader-writer further includes time information specifying a time at which contactless communication was carried out with the reader-writer, and the wireless communication unit is operable, when the server apparatus has judged based on the time information that there is at least one privilege available to the user on the service used by the user, to receive information relating to the at least one privilege available to the user from the server apparatus.

In this configuration, the link information received by the contactless communication unit from the reader-writer further includes condition information relating to a necessary condition for the user to obtain the at least one privilege, and the wireless communication unit is operable, when the server apparatus has judged based on the condition information that there is at least one privilege available to the user on the service used by the user, to receive information relating to the at least one privilege available to the user from the server apparatus.

In this configuration, the wireless communication unit is operable when accessing the server apparatus based on the link information, to transmit a terminal identifier, which is unique to the mobile terminal, to the server apparatus separately to the link information and the IC identifier and operable when the server apparatus has judged based on the terminal identifier that there is at least one privilege that is available to the user on a service used by the user, to receive information relating to the at least one privilege available to the user from the server apparatus.

In this configuration, the mobile terminal further includes a display unit displaying information relating to the at least one privilege available to the user received by the wireless communication unit on a screen.

In this configuration, the wireless communication unit transmits information relating to at least one privilege selected by the user out of the information relating to the at least one privilege available to the user to the server apparatus.

According to another embodiment of the present invention, there is provided an information transmitting/receiving method includes steps of transmitting an IC identifier that specifies an IC chip installed in a mobile terminal to a reader-writer that carries out contactless communication and receiving link information including the IC identifier from the reader-writer, and accessing a server apparatus based on the link information, transmitting the link information to the server apparatus, transmitting the IC identifier to the server apparatus separately to the link information, and receiving, when the server apparatus has judged based on the IC identifier that contactless communication with the reader-writer and access to the server apparatus were both carried out using a same mobile terminal owned by a user, information relating to at least one privilege available to the user on a service used by the user from the server apparatus.

According to another embodiment of the present invention, there is provided a server apparatus that is accessed by a mobile telephone, which includes a contactless communication unit transmitting an IC identifier that specifies an IC chip installed inside the mobile terminal to a reader-writer that carries out contactless communication and receiving link information including the IC identifier from the reader-writer, based on the link information. The server apparatus includes a receiving unit receiving the link information from the mobile terminal and also receiving the IC identifier from the mobile terminal separately to the link information, and a transmitting unit operable when it has been judged based on the IC identifier that contactless communication with the reader-writer and access to the server apparatus were both carried out using a same mobile terminal owned by a user, to transmit information relating to at least one privilege available to the user on a service used by the user to the mobile terminal.

According to another embodiment of the present invention, there is provided a reader-writer includes a receiving unit receiving an IC identifier specifying an IC chip installed inside a mobile terminal from the mobile terminal by contactless communication, a generating unit generating link information including the IC identifier based on the IC identifier, and a transmitting unit accessing a server apparatus based on the link information, transmitting the link information to the server apparatus and transmitting the IC identifier to the server apparatus separately to the link information, and operable, when the server apparatus has judged based on the IC identifier that contactless communication with the reader-writer and access to the server apparatus were both carried out using a same mobile terminal owned by a user, to transmit the link information by contactless communication to a mobile terminal including a wireless communication unit that receives information relating to at least one privilege available to the user on a service used by the user from the server apparatus.

According to another embodiment of the present invention, there is provided a member privilege acquiring system includes a reader-writer including a receiving unit receiving an IC identifier that specifies an IC chip installed inside a mobile terminal from the mobile terminal via contactless communication, a generating unit generating link information including the IC identifier based on the IC identifier, and a transmitting unit transmitting the link information to the mobile terminal via contactless communication, a mobile terminal including a contactless communication unit receiving link information including the IC identifier from the reader-writer, and a wireless communication unit accessing a server apparatus based on the link information, transmitting the link information to the server apparatus and transmitting the IC identifier to the server apparatus separately to the link information, and a server apparatus including a receiving unit receiving the link information and the IC identifier from the mobile terminal, and a transmitting unit operable when it has been judged based on the IC identifier that contactless communication with the reader-writer and access to the server apparatus were both carried out using a same mobile terminal owned by a user, to transmit information relating to at least one privilege available to the user on a service used by the user to the mobile terminal.

According to the embodiments of the present invention described above, it is possible to reliably grant privileges that are available to a user on a service used by the user to a user of a mobile terminal that has carried out contactless communication with a reader-writer.

BRIEF DESCRIPTION OF THE DRAWINGS

FIG. 10A is a diagram useful in showing data items in various databases according to the same embodiment;

FIG. 10B is a diagram useful in showing data items in various databases according to the same embodiment;

FIG. 10C is a diagram useful in showing data items in various databases according to the same embodiment;

FIG. 11A is a diagram useful in showing URLs used in the system according to the same embodiment;

FIG. 11B is a diagram useful in showing URLs used in the system according to the same embodiment;

DETAILED DESCRIPTION OF THE EMBODIMENTS

Figure 1:
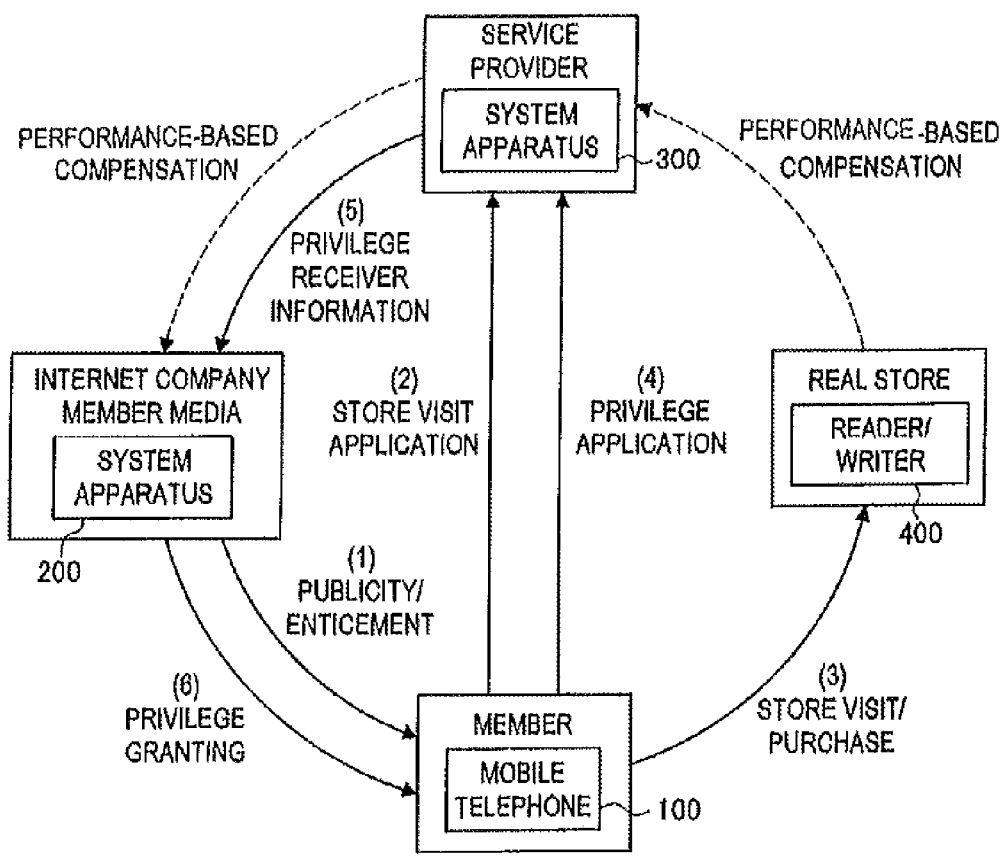
FIG. 1 is a schematic diagram showing a system according to an embodiment of the present invention.
Figure 2:
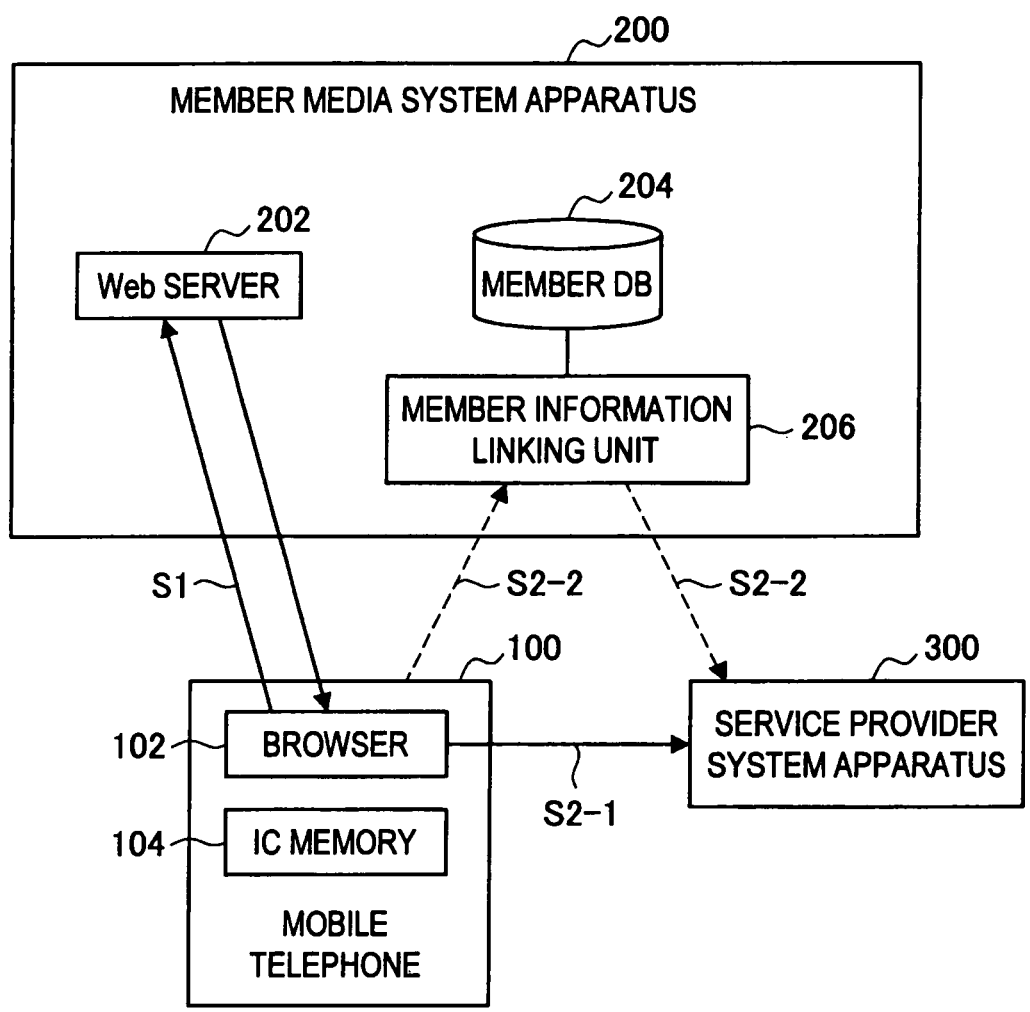
FIG. 2 is a block diagram showing part of the system according to the same embodiment.
Figure 3:
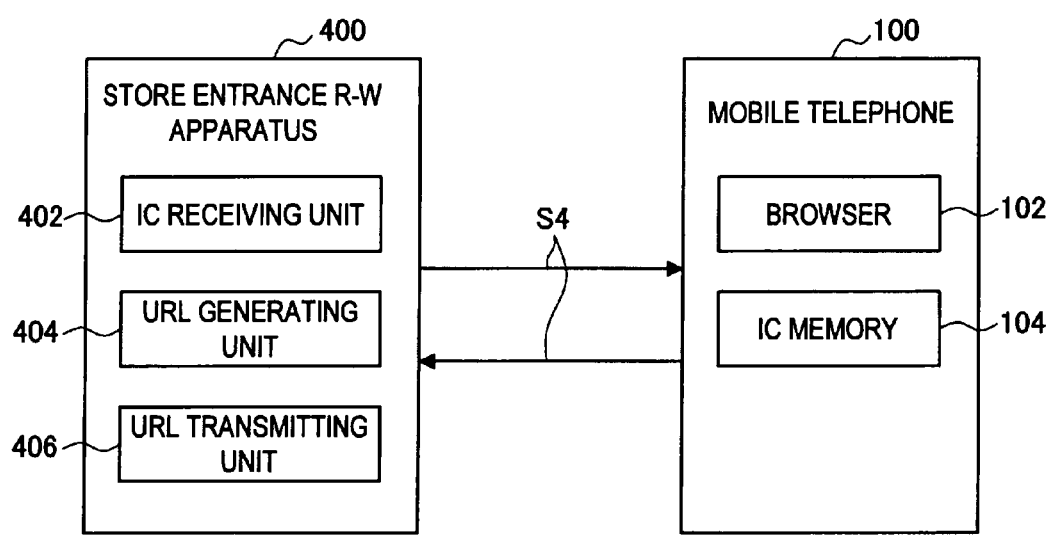
FIG. 3 is a block diagram showing part of the system according to the same embodiment.
Figure 4:
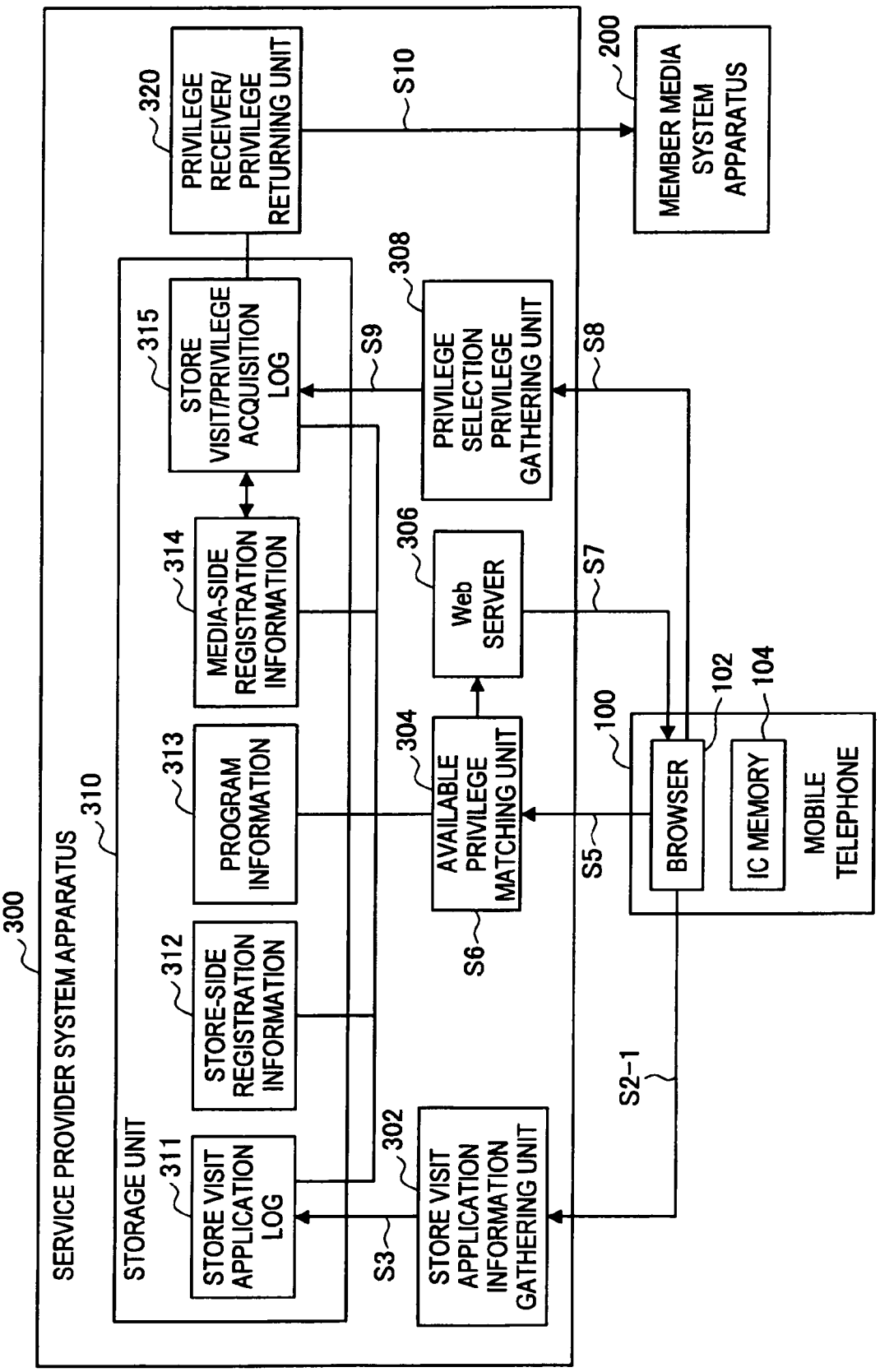
FIG. 4 is a block diagram showing part of the system according to the same embodiment.
Figure 5:
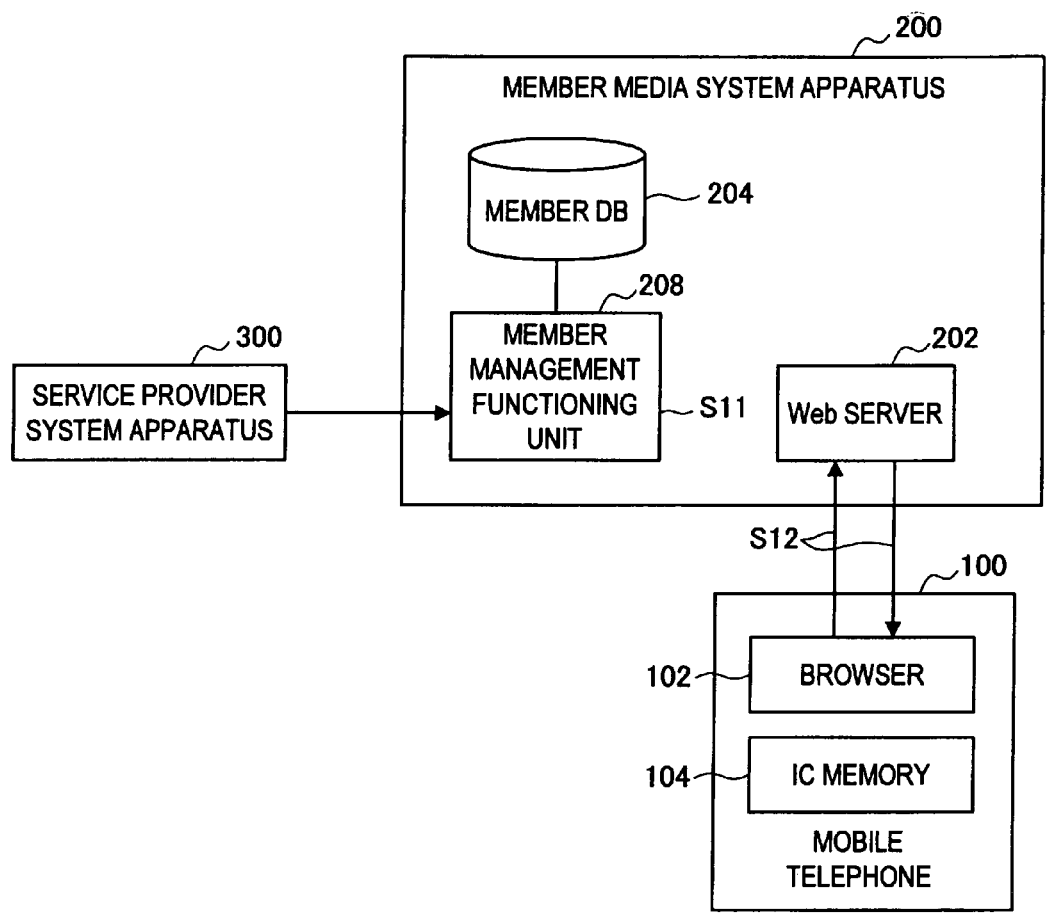
FIG. 5 is a block diagram showing part of the system according to the same embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.

1. Overview of the Present Embodiment
2. Detailed Configuration and Operation of the Present Embodiment [0027]

1. Overview of the Present Embodiment

In a system according to an embodiment of the present invention, the user accesses a system apparatus 300 of a service provider via wireless communication using a mobile telephone 100 and the system apparatus 300 of the service provider then grasps that the user has viewed publicity for a real store on an Internet site. By having the user access a URL (link information) transmitted from a push-type reader-writer 400 present at a store entrance, store visit/purchase information for the user is transmitted to the system apparatus 300 of the service provider. In the present embodiment, by using the low-cost push-type reader-writer 400 and making use of three-way near-field communication, it is easy to realize a service (system) that can withstand commercial use and open up new business opportunities.

Here, the user is motivated to pass his or her mobile telephone 100 over the reader-writer 400 on entering a store by a "member media" (in the present specification indicating an Internet company that runs a member-based website) paying part of the performance-based compensation the member media receives from the store to a member (i.e., the user) in the form of points or the like.

Also, according to the present embodiment, a service capable of withstanding commercial use while taking every possible step to prevent illegal activity can be realized by a system including contactless communication technology installed in the mobile telephone 100, the reader-writer 400 that pushes a suitable URL via contactless communication, and a server in overall control of the system.

The system according to the present embodiment includes a system apparatus 200 managed by a member media on the Internet, the mobile telephone 100 that is owned by a member of the member media, the system apparatus 300 that is managed by a service provider, the reader-writer 400 that is installed in a real store, and the like. FIG. 1 is a schematic diagram showing the system according to the present embodiment.

(1) First, an advertisement for a real store is placed on a website on the Internet by the system apparatus 200 of the member media to publicize the real store to the members and entice the members to the real store.

(2) After this, a member who sees the advertisement and wishes to visit the store uses the mobile telephone 100 to issue a store visit application showing that the user wishes to visit the real store to the system apparatus 300 of the service provider.

(3) The member then actually visits the real store and in some cases purchases a product. When doing so, the member passes his or her mobile telephone 100 over the reader-writer 400 installed at the store entrance and acquires a URL.

(4) After this, the member uses the acquired URL to access the site of the service provider using the mobile telephone 100. By doing so, selectable privileges are displayed on the screen of the mobile telephone 100. The member selects a privilege, such as points the user wishes to save, and applies to acquire the privilege.

(5) Next, the system apparatus 300 of the service provider transmits information relating to the privilege receiver to the system apparatus 200 of the member media.

(6) Finally, the system apparatus 200 of the member media grants the privilege to the member to complete the series of operations that realize the service.

2. Detailed Configuration and Operation of the Present Embodiment

Figure 6:
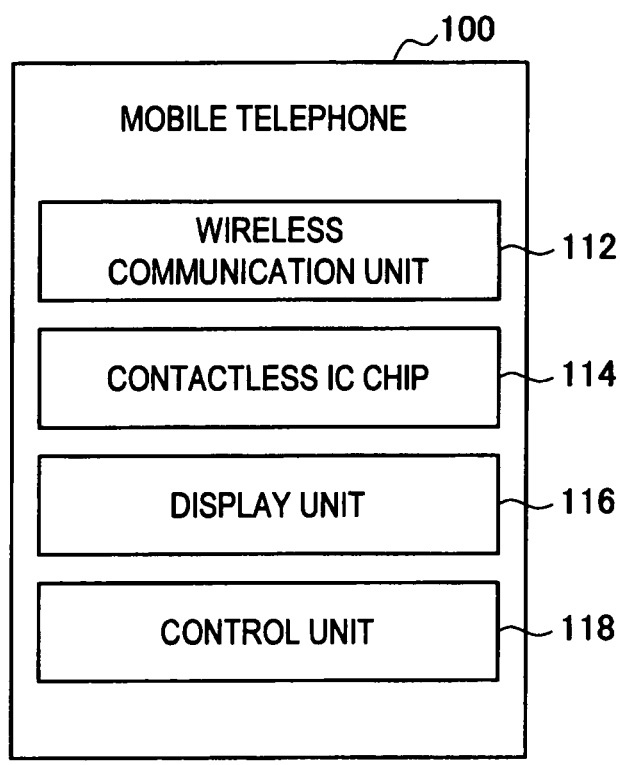
FIG. 6 is a block diagram showing a mobile telephone 100 according to the same embodiment.

The present embodiment will now be described in more detail with reference to FIGS. 2 to 6. FIGS. 2 to 5 are block diagrams showing parts of the system according to the present embodiment. FIG. 6 is a block diagram showing the mobile telephone 100 according to the present embodiment. The mobile telephone 100 includes a wireless communication unit 112 that carries out wireless communication, a contactless IC chip 114 that carries out contactless communication, a display unit 116 that displays images, a control unit 118 that controls the various component elements, and the like.

First, privilege information on privileges a member can acquire and a link to the system apparatus 300 of the service provider are distributed by wireless communication from a Web server 202 of the system apparatus 200 of the member media to the mobile telephone 100 (step S1). By doing so, a link is displayed by a browser 102 or in electronic mail on the mobile telephone 100.

Figure 7A:
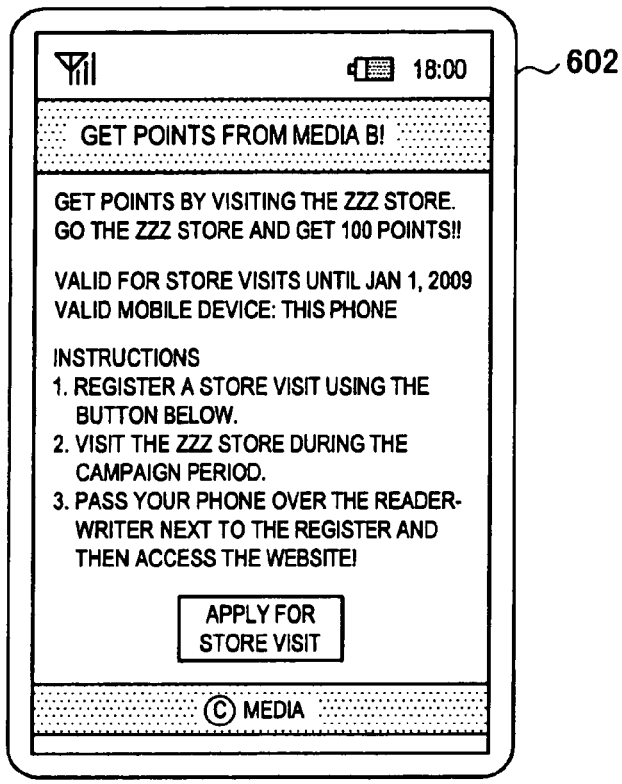
FIG. 7A is a diagram useful in showing a screen on the mobile telephone 100 according to the same embodiment.
Figure 7B:
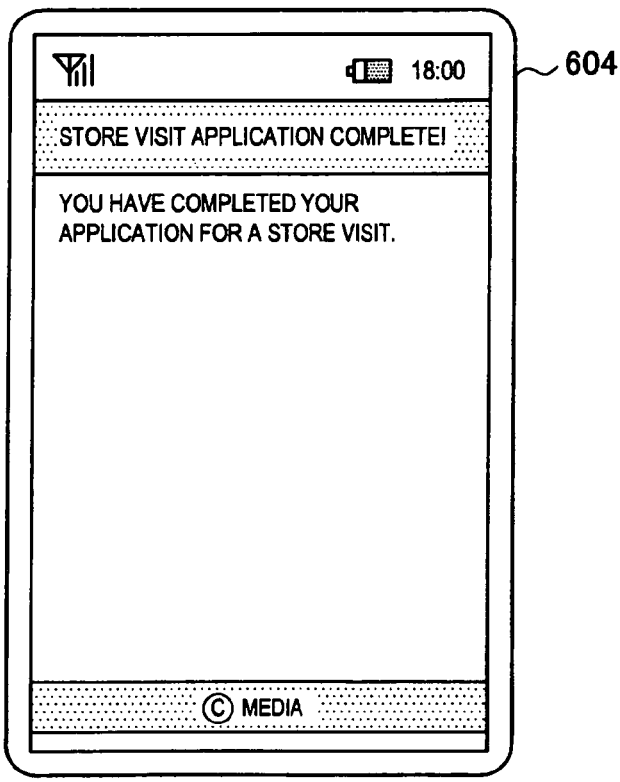
FIG. 7B is a diagram useful in showing a screen on the mobile telephone 100 according to the same embodiment.

Next, a member who has seen the advertisement and wishes to visit the real store makes a store visit application to the system apparatus 300 of the service provider (step S2-1). The store visit application is made by the member clicking on a link on the browser 102. A screen 602 on the mobile telephone 100 relating to a store visit application is shown in FIG. 7A and a screen 604 relating to store visit application completion is shown in FIG. 7B.

FIG. 11A shows a URL sent from the system apparatus 200 of the member media to the mobile telephone 100, which is a URL for accessing the system apparatus 300 of a service provider when making a store visit application. A program ID and media ID are embedded in the URL, so that the system apparatus 300 of the service provider is capable of specifying for which privilege from which media the mobile telephone 100 has accessed the system apparatus 300.

When a store visit application is made by the browser 102, URL information (campaign information (program ID), media ID), a store visit application time and date, store visit application information, and a terminal unique ID (terminal identifier) of the mobile telephone 100 of the applying user are sent from the mobile telephone 100 to the system apparatus 300 of the service provider. Such information is gathered by a store visit application information gathering unit 302 of the system apparatus 300 of the service provider.

Here, the expression "terminal unique ID" of the mobile telephone 100 refers for example to a unique number associated with a SIM card of the mobile telephone 100. The expression "program ID" refers to a unique number associated with information that links a real store with a member media, information relating to privileges granted to users, and the like.

Note that during a store visit application, an IC chip unique ID (IC identifier) may also be sent from the mobile telephone 100 to the system apparatus 300 of the service provider. The expression "IC chip unique ID" refers to a unique number that is associated with the contactless IC chip 114 installed in the mobile telephone 100. In this case, the IC chip unique ID is sent by an application aside from the browser 102 from the mobile telephone 100 to the system apparatus 300 of the service provider.

Step S2-1 above corresponds to a case where the system apparatus 200 of the member media acquires the terminal unique ID of the mobile telephone 100 for each member in advance and is capable of identifying a member using only the terminal unique ID of the mobile telephone 100. In this case, in the system apparatus 200 of the member media, each terminal unique ID of a mobile telephone 100 is linked to a member ID of a member. This means that in step S10, described later, by merely sending back the terminal unique ID of the mobile telephone 100 from the system apparatus 300 of the service provider to the system apparatus 200 of the member media, the system apparatus 200 is capable of specifying a member in step S11. The system apparatus 200 of the member media then becomes able to grant a privilege to the specified member.

Meanwhile, in a case where it is not possible for the system apparatus 200 of the member media to specify a member from only the terminal unique ID of the mobile telephone 100, the processing described below is carried out. That is, when the user has clicked on a store visit application link, a member information linking unit 206 of the system apparatus 200 of the member media informs the system apparatus 300 of the service provider of the member ID of the member managed by the system apparatus 200 of the member media together with the terminal unique ID of the mobile telephone 100 (step S2-2). In this case, the system apparatus 300 of the service provider links the terminal ID of the mobile telephone 100 with the member ID of the member. Next, in step S10, described later, by merely sending back the terminal unique ID of the mobile telephone 100 and the member ID of the member from the system apparatus 300 of the service provider to the system apparatus 200 of the member media, the system apparatus 200 of the member media is able to specify a member in step S11. The system apparatus 200 of the member media is then able to grant a privilege to the specified member. A member DB 204 manages information in which member numbers relating to members of the member media and terminal unique IDs of mobile telephones 100 are linked.

The store visit application information gathering unit 302 of the system apparatus 300 of the service provider records log information for grasping who has applied from what member media to visit what store and to acquire what privilege in a storage unit 310 as a store visit application log 311. One example of a store visit application log 311 is shown in Table (A) in FIG. 10A.

When a member actually visits a real store or makes a purchase, the mobile telephone 100 of the member is passed over the reader-writer 400 at the store entrance. After this, an ID receiving unit 402 of the reader-writer 400 reads the IC chip unique ID of the mobile telephone 100 through contactless communication with the mobile telephone 100 (step S4).

A URL generating unit 404 of the reader-writer 400 generates a URL to be transmitted using push transmission to the mobile telephone 100 based on the IC chip unique ID, a reader-writer ID (reader-writer identifier), and the like. When doing so, the URL is also signed (encrypted). A URL transmitting unit 406 of the reader-writer 400 transmits the generated URL to the mobile telephone 100 according to push transmission (step S4).

Next, to obtain privilege information on privileges that are available or unavailable in accordance with a store visit or purchase, the member uses the acquired URL to access the system apparatus 300 of the service provider (step S5). At this time, URL information, an IC chip unique ID, and the terminal unique ID of the mobile telephone 100 are sent from the mobile telephone 100 to the system apparatus 300 of the service provider. Here, the URL information, the IC chip unique ID, and the terminal unique ID are sent separately. The IC chip unique ID is sent from the mobile telephone 100 to the system apparatus 300 of the service provider via the browser 102 and an application aside from the browser 102.

When the mobile telephone 100 belonging to a user has accessed the Web, an available privilege matching unit 304 of the system apparatus 300 of the service provider gathers the URL information, the IC chip unique ID, and the terminal unique ID of the mobile telephone 100.

After this, the available privilege matching unit 304 extracts available or unavailable privilege information. When doing so, the available privilege matching unit 304 refers to the URL information, the IC chip unique ID, the terminal unique ID of the mobile telephone 100, store-side registration information 312, program information 313, media-side registration information 314, and the like. The store-side registration information 312 is basic store information on stores corresponding to the service according to the present embodiment that is provided by the service provider, RW setting information on stores where a reader-writer 400 has been installed, and the like. One example of the basic store information is shown in Table (B) in FIG. 10A, and one example of the RW setting information is shown in Table (C) in FIG. 10A. The program information 313 is campaign information such as a linked relationship between real stores and a member media, for example, combination data for an affiliated member media (where a user can obtain a privilege) and real stores, privileges to be granted, and privilege limitations (for example, a granting period). One example of the campaign information is shown in Table (D) in FIG. 10B. The media-side registration information 314 is basic media information on a member media corresponding to the service according to the present embodiment provided by the service provider. One example of the basic media information is shown in Table (E) in FIG. 10B.

Figure 8A:
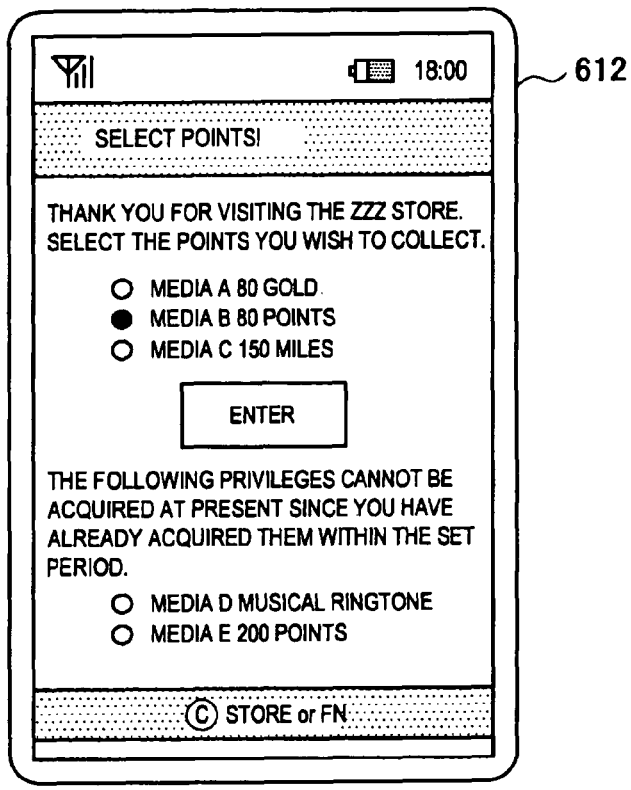
FIG. 8A is a diagram useful in showing a screen on the mobile telephone 100 according to the same embodiment.
Figure 8B:
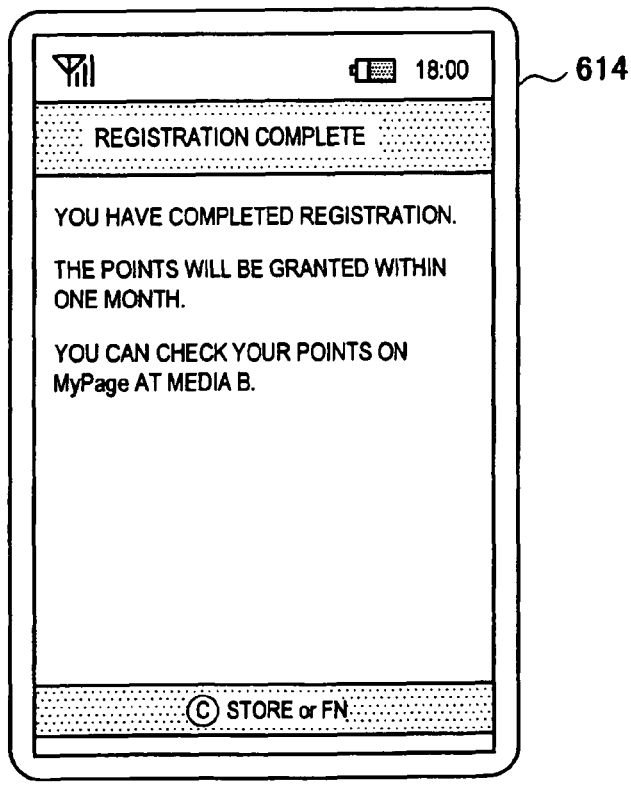
FIG. 8B is a diagram useful in showing a screen on the mobile telephone 100 according to the same embodiment.

Next, a Web server 306 distributes available privilege information and unavailable privilege information extracted by the available privilege matching unit 304 to the mobile telephone 100 of the user using wireless communication (step S7). The member then selects the privilege to be acquired on the screen of the mobile telephone 100 and the selected privilege information is sent to the system apparatus 300 of the service provider. When doing so, the terminal unique ID of the mobile telephone 100 and the IC chip unique ID are also sent from the mobile telephone 100 to the system apparatus 300 of the service provider. A privilege selection privilege gathering unit 308 gathers the acquired privilege information that was selected by the user (step S8). A screen 612 of the mobile telephone 100 when the member selects a privilege is shown in FIG. 8A and a screen 614 of the mobile telephone 100 when registration is complete for a privilege selection is shown in FIG. 8B.

Next, the privilege selection privilege gathering unit 308 registers the privilege information selected by the user, the user information, the privilege acquisition date/time and the like as a store visit/privilege acquisition log 315 in the storage unit 310 (step S9). One example of a store visit/web access/ privilege acquisition log is shown in Table (F) in FIG. 10C.

After this, a privilege receiver/privilege returning unit 320 of the system apparatus 300 of the service provider returns a privilege receiver list and/or the selected privilege to the system apparatus 200 of the member media (step S10). A member management functioning unit 208 of the system apparatus 200 of the member media registers the reflected privilege in the member DB 204 to reflect the privilege information for the member who has made a store visit and/or purchase (step S11). One example of the media-side member DB is shown in Table (G) in FIG. 10C.

Figure 9:
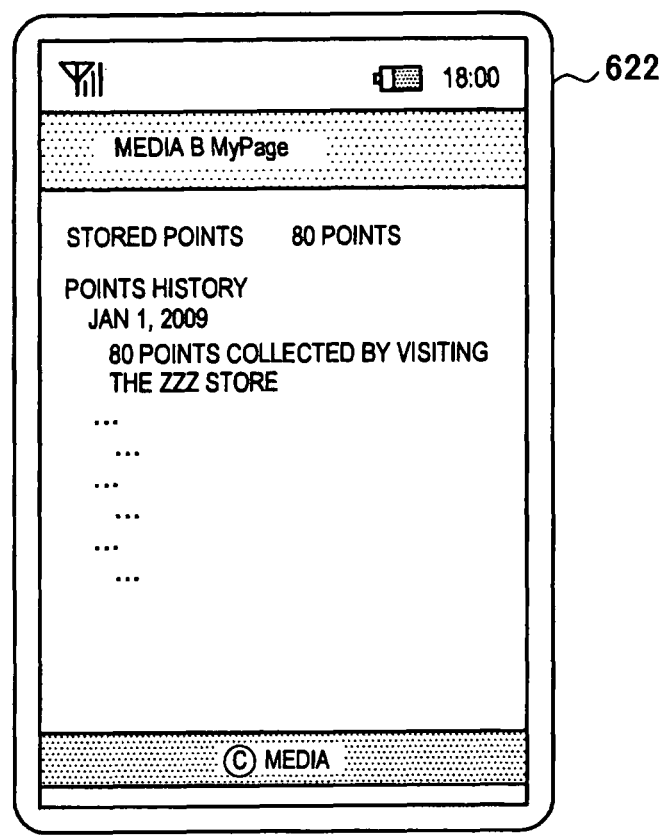
FIG. 9 is a diagram useful in showing a screen on the mobile telephone 100 according to the same embodiment.

In response to a request from the mobile telephone 100, the Web server 202 of the system apparatus 200 of the member media distributes the reflected privilege to the user (step S12). By doing so, the mobile telephone 100 becomes able to display information relating to the granted privilege on the screen. A screen 622 of the mobile telephone 100 for confirming the acquisition of a privilege is shown in FIG. 9.

Next, the flow relating to matching of available or unavailable privileges and recording in the privilege acquisition log will be described with reference to FIGS. 11B, 12A, and 12B.

FIG. 11B shows a URL that is generated by the reader-writer 400 and pushed to the mobile telephone 100, the URL enabling access to the system apparatus 300 of the service provider when the mobile telephone 100 displays available privileges. The IC chip unique ID, a timestamp (time information), a reader-writer ID, and other parameters (condition information) are embedded in the URL.

The IC chip unique ID embedded in the URL is an ID for informing the system apparatus 300 of the service provider of the mobile telephone 100 that has been passed over the reader-writer 400. That is, it is possible to confirm whether the user that has actually passed the mobile telephone 100 over the reader-writer 400 at the store entrance (i.e., the user who has visited the store) is accessing the system apparatus 300 of the service provider to acquire a privilege. When a privilege is being acquired, the IC chip unique ID is sent from the mobile telephone 100 to the system apparatus 300 of the service provider separately to the URL information. By comparing such IC chip unique ID and the IC chip unique ID in the URL information, it is possible to confirm that a privilege granting right has not been transferred to another person by transferring a URL after the user has visited the store.

The timestamp embedded in the URL is used to set a time-based limit, such as limiting the acquiring of a privilege to a maximum of once a week. The timestamp embedded in the URL can also be used to prevent illegal acquisition of privileges such as by passing the mobile telephone 100 multiple times in a short time period.

The reader-writer ID embedded in the URL is an ID specifying a real store and/or a privilege content. By using the reader-writer ID, it is possible to specify at which store the user has pass the mobile telephone 100 over a reader-writer 400.

Although not an essential condition, the other parameters embedded into the URL are information relating to products purchased by the user. For example, it is possible to extend the setting conditions for the performance-based compensation in accordance with a product number, a product price, a number of orders, a unique number during an order such as a product code, a purchase total, purchased products, and the like. As examples, conditions may be set for when the user's purchases equal or exceed a certain monetary amount or when the user has purchased a specific product. Such a system may be realized by linking the reader-writer 400 and a POS terminal.

Figure 12A:
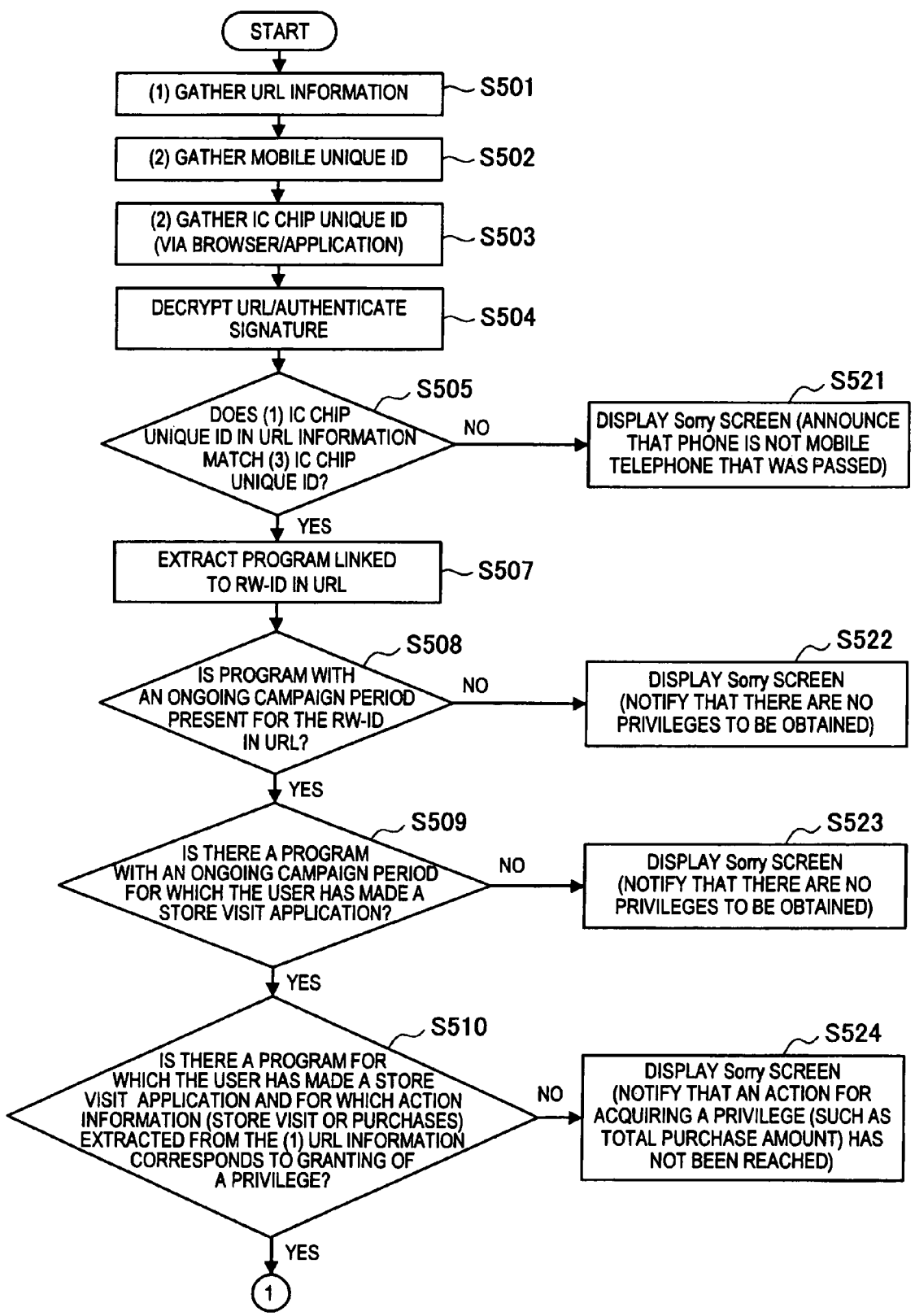
FIG. 12A is a flowchart showing matching of available or unavailable privileges and recording of a privilege acquisition log by the system according to the same embodiment.
Figure 12B:
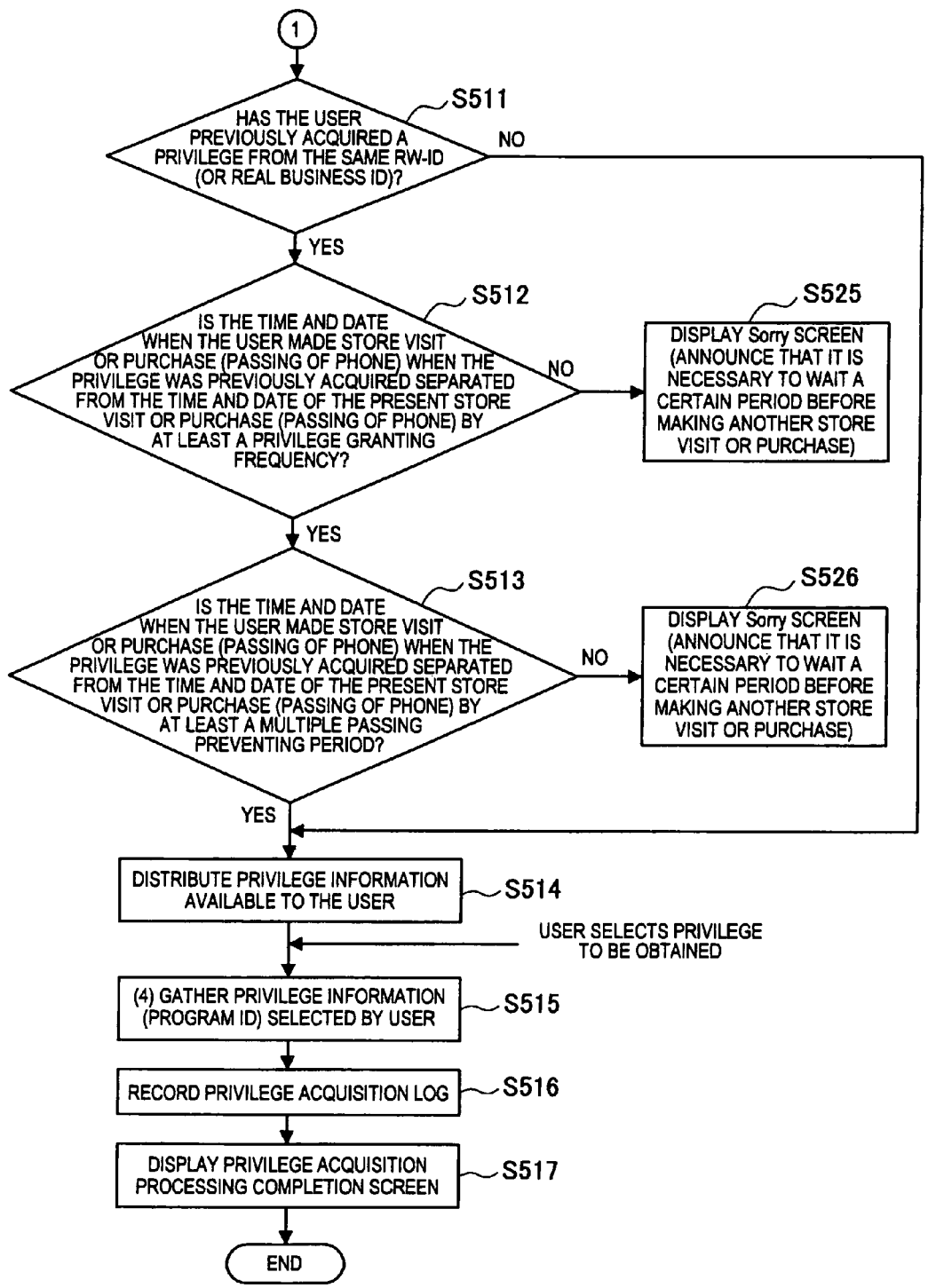
FIG. 12B is a flowchart showing matching of available or unavailable privileges and recording of a privilege acquisition log by the system according to the same embodiment.

First, the system apparatus 300 of the service provider gathers the URL information (step S501 in FIG. 12A). The system apparatus 300 of the service provider gathers the terminal unique ID of the mobile telephone 100 (step S502). In addition, the system apparatus 300 of the service provider gathers the IC chip unique ID (step S503). Note that the IC chip unique ID is transmitted to the system apparatus 300 of the service provider by an application installed in the mobile telephone 100. As one example, such application is launched when the URL is clicked by a user to display available or unavailable privileges. After this, the application acquires the IC chip unique ID and transmits the IC chip unique ID to the system apparatus 300 of the service provider.

Next, in the system apparatus 300 of the service provider, the URL is decrypted and the signature is authenticated (step S504).

After this, it is judged whether the IC chip unique ID in the URL information matches the IC chip unique ID transmitted by the application (step S505). If the URLs do not match, the system apparatus 300 of the service provider announces that the mobile telephone 100 that is attempting to acquire a privilege is not the mobile telephone 100 that was passed over the reader-writer 400 (step S521).

If the URLs match, the system apparatus 300 of the service provider extracts a program that is linked to the reader-writer ID embedded in the URL information (step S507). Note that the reader-writer ID is also capable of being used to extract store visit performance and to generate a report when the user makes another store visit after a certain time has passed. It is also possible, even for reader-writers 400 in the same store, to use the reader-writer ID to make settings such as changing the privilege (program) granted to the user.

After this, the system apparatus 300 refers to the RW setting information and judges whether a program with an ongoing campaign period is present for the reader-writer ID in the URL information (step S508). More specifically, from the program ID relating to a privilege included in the RW setting information, the system apparatus 300 refers to the program information 313 and judges whether the store visit time and date is included in a privilege granting period. If there is no program with an ongoing campaign period, the system apparatus 300 of the service provider announces that there are no privileges to be obtained (step S522).

If there is a program with an ongoing campaign period, it is judged whether there is a program with an ongoing campaign period for which the user has made a store visit application (step S509). More specifically, the terminal unique ID of the mobile telephone 100 is matched against the store visit application log 311. If there is no program with an ongoing campaign period for which the user made a store visit application, the system apparatus 300 of the service provider announces that there are no privileges to be obtained (step S523).

If there is a program with an ongoing campaign period for which the user has made a store visit application, it is then judged whether there is a program for which the user has made a store visit application and for which action information (a store visit or purchases) extracted from the URL information corresponds to the granting of a privilege (step S510). More specifically, the other parameters in the URL information are matched against the program information 313. If the action information (store visit or purchases) extracted from the URL information does not correspond to the granting of a privilege, notification is given that an action required to acquire a privilege (for example, a total purchase amount) has not been reached (step S524).

If the action information (store visit or purchases) extracted from the URL information corresponds to the granting of a privilege, it is then judged whether the user has previously acquired a privilege from the same reader-writer ID (or real business ID) (step S511). If the user has not previously acquired a privilege from the same reader-writer ID (or real business ID), the processing proceeds to step S514.

If the user has previously acquired a privilege from the same reader-writer ID (or real business ID), it is then judged whether the time and date when the user made a store visit or purchase (i.e., when the mobile telephone 100 was passed over the reader-writer 400) when the privilege was previously acquired is separated from the time and date of the present store visit or purchase (i.e., when the mobile telephone 100 was passed over the reader-writer 400) by at least a privilege granting frequency (step S512). More specifically, a privilege acquisition log (the store visit/privilege acquisition log 315) of the user (i.e., the terminal unique ID of the mobile telephone 100) is matched against the privilege granting frequency in the program information 313.

When it has been judged that the time and date when the user made a store visit or purchase (i.e., when the mobile telephone 100 was passed over the reader-writer 400) when the privilege was previously acquired is not separated from the time and date of the present store visit or purchase (i.e., when the mobile telephone 100 was passed over the reader-writer 400) by at least the privilege granting frequency, the system apparatus 300 of the service provider announces that it is necessary to wait a certain period before making another store visit or purchase (step S525).

When it has been judged that the time and date when the user made a store visit or purchase (i.e., when the mobile telephone 100 was passed over the reader-writer 400) when the privilege was previously acquired is separated from the time and date of the present store visit or purchase (i.e., when the mobile telephone 100 was passed over the reader-writer 400) by at least the privilege granting frequency, it is then judged whether the time and date when the user made a store visit or purchase (i.e., when the mobile telephone 100 was passed over the reader-writer 400) when the privilege was previously acquired is separated from the time and date of the present store visit or purchase (i.e., when the mobile telephone 100 was passed over the reader-writer 400) by at least a multiple passing preventing period (step S513). More specifically, the privilege acquisition log (the store visit/privilege acquisition log 315) of the user (the terminal unique ID of the mobile telephone 100) is matched against the multiple passing preventing period in the program information 313.

When it has been judged that the time and date when the user made a store visit or purchase (i.e., when the mobile telephone 100 was passed over the reader-writer 400) when the privilege was previously acquired is not separated from the time and date of the present store visit or purchase (i.e., when the mobile telephone 100 was passed over the reader-writer 400) by at least the multiple passing preventing period, the system apparatus 300 of the service provider announces that it is necessary to wait a certain period before making another store visit or purchase (step S526).

When it has been judged that the time and date when the user made a store visit or purchase (i.e., when the mobile telephone 100 was passed over the reader-writer 400) when the privilege was previously acquired is separated from the time and date of the present store visit or purchase (i.e., when the mobile telephone 100 was passed over the reader-writer 400) by at least the multiple passing preventing period, the system apparatus 300 of the service provider distributes privilege information that is available to the user (step S514).

Next, when the privilege to be acquired has been selected by the user, the system apparatus 300 of the service provider gathers the privilege information (program ID) selected by the user (step S515). The system apparatus 300 of the service provider also records the privilege acquisition log (step S516). In addition, the system apparatus 300 of the service provider has a privilege acquisition processing completion screen displayed on the mobile telephone 100 (step S517).

As described above, in the present embodiment, the reader-writer ID and the timestamp embedded in the URL information are recognized by the system apparatus 300 of the service provider as unique numbers in every Push URL. By doing so, by managing whether the user has already acquired a privilege using such information in combination with the terminal unique ID (or IC chip unique ID) of the mobile telephone 100, it is possible to prevent illegal activity that attempts to acquire privileges numerous times using the same URL.

By using the concept of time in the form of the time stamp embedded in the URL information, it is possible to know the time at which the mobile telephone 100 was passed over the reader-writer 400. Accordingly, it is possible to prevent illegal activity where the user attempts to acquire a privilege multiple times by making multiple passes on a single store visit to acquire a plurality of URLs. Also, by using the concept of time in the form of the time stamp embedded in the URL information, it is possible to measure how much time has elapsed since the previous time the mobile telephone 100 was passed over the reader-writer 400. Accordingly, it becomes possible to design services where a privilege can be acquired a maximum of once a month, for example.

In addition, by adding a signature to the URL information, it is possible to prevent illegal activity that acquires privileges by tampering with the content of URLs.

In addition, when the mobile telephone 100 has been passed over the reader-writer 400, the IC chip unique ID is embedded in the URL pushed by the reader-writer 400, and when the mobile telephone 100 accesses the system apparatus 300 of the service provider, the IC chip unique ID is also transmitted by an application. By doing so, it is possible to confirm that the person who passed the mobile telephone 100 over the reader-writer 400 at a real store is attempting to acquire a privilege on the site of the service provider. Accordingly, it is possible to prevent illegal activity where an acquaintance of the user acquires a privilege due to the user transferring the URL acquired from the reader-writer 400 to the acquaintance.

As described above, according to the present embodiment, it is possible to track which user has viewed which website on the Internet, visited or made a purchase at which real store, and selected and acquired which privilege. As a result, it is possible to accurately measure the cost versus effect (store visit performance, purchase performance, or the like) for the advertising cost (promotional cost) relating to a media site used for publicity by a real store (business) that places store visit/purchase advertisements. Also, by making it possible to grasp the store visit/purchase performance for each store and for each media publicizing the stores by way of advertisements, performance-based compensation set in accordance with the effect of advertising becomes possible for media that publicize stores. As a result, it is possible to realize an affiliation business which adds new parameters in the form of real-world user actions (store visits and purchases at real stores) to the field of affiliation which is limited with existing technology to actions carried out on the Internet.

In addition, with the system according to the present embodiment, since a viewed site classification, site viewing time, visited/purchase store, store visit/purchase time, store visit/purchase frequency, selected privilege and the like are recorded for each user in the log, the system has potential to be applied to new behavioral marketing and has the potential to popularize targeted advertising or the like that is based on past behavior.

By making use of the contactless communication technology of the contactless IC chip installed in the mobile telephone 100 and the reader-writer (RW apparatus) 400, it is possible to achieve security that prevents illegal activity and to flexibly set services without increased complexity or an increased operational burden for users. This means it is possible to realize a favorable platform for business.

In addition, it is possible to realize a "must-buy" campaign using the system according to the present embodiment. As a result, compared to an existing method where serial stickers are issued and stuck onto products, it is possible to dramatically reduce the campaign cost (the cost of producing serial stickers is typically several yen or higher per sticker) and the lead time until a campaign period starts. For campaign users also, since it is not necessary to access a website and input a serial number every time a product is purchased or to attach stickers that prove products have been purchased onto a postcard and post them to the manufacturer, it becomes easier to apply for a campaign.

Also, by using the contactless IC chip installed in the mobile telephone 100 and the Push function of the reader-writer 400 to lead to subsequent communication between the mobile telephone 100 and the server, it is not necessary to connect the reader-writer 400 itself to a system or network provided in the store. As a result, it is possible to introduce and maintain the system according to the present embodiment easily and at low cost.

Although preferred embodiments of the present invention have been described in detail with reference to the attached drawings, the present invention is not limited to the above examples. It should be understood by those skilled in the art that various modifications, combinations, sub-combinations and alterations may occur depending on design requirements and other factors insofar as they are within the scope of the appended claims or the equivalents thereof.

What is claimed is:

1. A mobile terminal comprising:
a contactless communication unit to transmit an IC identifier that uniquely specifies an IC chip installed inside the mobile terminal to a reader-writer that carries out contactless communication and to receive link information including the IC identifier and time information from the reader-writer, in which the time information indicates a time at which contactless communication was carried out with the reader-writer; and
a wireless communication unit to access a server apparatus based on the link information, to transmit the link information to the server apparatus, to transmit the IC identifier to the server apparatus separately to the link information, and operable, when the server apparatus has judged (i) based on the IC identifier that contactless communication with the reader-writer and access to the server apparatus were both carried out using a same mobile terminal owned by a user and (ii) based on the time information that a timing of the contactless communication with the reader-writer satisfies a predetermined timing condition, to receive information relating to at least one privilege available to the user on a service used by the user from the server apparatus.

2. A mobile terminal according to claim 1,
wherein the link information received by the contactless communication unit from the reader-writer further includes a reader-writer identifier that specifies the reader-writer, and
the wireless communication unit is operable, when the server apparatus has judged based on the reader-writer identifier that there is at least one privilege available to the user on the service used by the user, to receive information relating to the at least one privilege available to the user from the server apparatus.

3. A mobile terminal according to claim 1,
wherein the wireless communication unit is operable when accessing the server apparatus based on the link information, to transmit a terminal identifier, which is unique to the mobile terminal, to the server apparatus separately to the link information and the IC identifier and operable when the server apparatus has judged based on the terminal identifier that there is at least one privilege that is available to the user on a service used by the user, to receive information relating to the at least one privilege available to the user from the server apparatus.

4. A mobile terminal according to claim 1 further comprising a display unit to display information relating to the at least one privilege available to the user received by the wireless communication unit on a screen.

5. A mobile terminal according to claim 1,
wherein the wireless communication unit transmits information relating to at least one privilege selected by the user out of the information relating to the at least one privilege available to the user to the server apparatus.

6. An information transmitting/receiving method comprising steps of:
transmitting from a mobile terminal an IC identifier that uniquely specifies an IC chip installed in the mobile terminal to a reader-writer that carries out contactless communication and receiving at the mobile terminal link information including the IC identifier and time information from the reader-writer, in which the time information indicates a time at which contactless communication was carried out with the reader-writer; and
accessing a server apparatus based on the link information, transmitting the link information to the server apparatus, transmitting the IC identifier to the server apparatus separately to the link information, and receiving, when the server apparatus has judged (i) based on the IC identifier that contactless communication with the reader-writer and access to the server apparatus were both carried out using a same mobile terminal owned by a user and (ii) based on the time information that a timing of the contactless communication with the reader-writer satisfies a predetermined timing condition, information relating to at least one privilege available to the user on a service used by the user from the server apparatus.

7. A server apparatus that is accessible by a mobile telephone, which includes a contactless communication unit transmitting an IC identifier that uniquely specifies an IC chip installed inside the mobile terminal to a reader-writer that carries out contactless communication and receiving link information including the IC identifier and time information from the reader-writer in which the time information indicates a time at which contactless communication was carried out with the reader-writer, based on the link information, the server apparatus comprising:
a receiving unit to receive the link information from the mobile terminal and also to receive the IC identifier from the mobile terminal separately to the link information; and
a transmitting unit operable when it has been judged (i) based on the IC identifier that contactless communication with the reader-writer and access to the server apparatus were both carried out using a same mobile terminal owned by a user and (ii) based on the time information that a timing of the contactless communication with the reader-writer satisfies a predetermined timing condition, to transmit information relating to at least one privilege available to the user on a service used by the user to the mobile terminal.

8. A reader-writer comprising:
a receiving unit to receive an IC identifier specifying an IC chip installed inside a mobile terminal from the mobile terminal by contactless communication;
a generating unit generating link information including the IC identifier based on the IC identifier and time information, in which the time information indicates a time at which contactless communication was carried out with the reader-writer; and
a transmitting unit to access a server apparatus based on the link information, to transmit the link information to the server apparatus and to transmit the IC identifier to the server apparatus separately to the link information, and operable, when the server apparatus has judged (i) based on the IC identifier that contactless communication with the reader-writer and access to the server apparatus were both carried out using a same mobile terminal owned by a user and (ii) based on the time information that a timing of the contactless communication with the reader-writer satisfies a predetermined timing condition, to transmit the link information by contactless communication to a mobile terminal including a wireless communication unit that receives information relating to at least one privilege available to the user on a service used by the user from the server apparatus.

9. A member privilege acquiring system comprising:
a reader-writer including a receiving unit to receive an IC identifier that uniquely specifies an IC chip installed inside a mobile terminal from the mobile terminal via contactless communication, a generating unit to generate link information including the IC identifier based on the IC identifier and time information, and a transmitting unit to transmit the link information to the mobile terminal via contactless communication;
a mobile terminal including a contactless communication unit to receive link information including the IC identifier and the time information from the reader-writer, in which the time information indicates a time at which contactless communication was carried out with the reader-writer, and a wireless communication unit to access a server apparatus based on the link information, to transmit the link information to the server apparatus and to transmit the IC identifier to the server apparatus separately to the link information; and
a server apparatus including a receiving unit to receive the link information and the IC identifier from the mobile terminal, and a transmitting unit operable when it has been judged (i) based on the IC identifier that contactless communication with the reader-writer and access to the server apparatus were both carried out using a same mobile terminal owned by a user and (ii) based on the time information that a timing of the contactless communication with the reader-writer satisfies a predetermined timing condition, to transmit information relating to at least one privilege available to the user on a service used by the user to the mobile terminal.

10. A mobile terminal according to claim 1, wherein the link information is a URL.

11. A mobile terminal according to claim 10, wherein the URL is encrypted.

12. A mobile terminal according to claim 1, in which the predetermined timing condition pertains to a time limit.

13. A mobile terminal according to claim 12, in which the time limit limits acquiring a respective privilege to a predetermined maximum number of times within a predetermined period of time.

14. A mobile terminal according to claim 13, in which the predetermined maximum number of times is one and the predetermined period of time is one week, such that the time limit limits acquiring of the respective privilege to a maximum of once per week.

* * * * *